(12) United States Patent  
Katahira

(10) Patent No.: US 9,494,847 B2
(45) Date of Patent: *Nov. 15, 2016

(54) IMAGE DISPLAY DEVICE AND IMAGE ADJUSTMENT METHOD

(71) Applicant: SEIKO EPSON CORPORATION, Tokyo (JP)

(72) Inventor: Toru Katahira, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 569 days.

This patent is subject to a terminal disclaimer.

(21) Appl. No.: 14/013,736

(22) Filed: Aug. 29, 2013

(65) Prior Publication Data

US 2013/0342817 A1 Dec. 26, 2013

Related U.S. Application Data

(63) Continuation of application No. 12/872,279, filed on Aug. 31, 2010, now Pat. No. 8,581,921.

(30) Foreign Application Priority Data

Sep. 1, 2009 (JP) ................................ 2009-201396

(51) Int. Cl.
*G09G 5/02* (2006.01)
*G09G 5/34* (2006.01)
(Continued)

(52) U.S. Cl.
CPC ............... *G03B 21/142* (2013.01); *G09G 5/02* (2013.01); *H04N 5/58* (2013.01); *H04N 9/3182* (2013.01); *H04N 9/3194* (2013.01); *H04N 21/4122* (2013.01); *H04N 21/42202* (2013.01); *H04N 21/4318* (2013.01); *G09G 3/34* (2013.01); *G09G2320/0626* (2013.01); *G09G 2320/0666* (2013.01); *G09G 2360/144* (2013.01)

(58) Field of Classification Search
CPC combination set(s) only.
See application file for complete search history.

(56) References Cited

U.S. PATENT DOCUMENTS 5,214,465 A    5/1993   Yamano et al.
6,064,468 A    5/2000   Sakaguchi
(Continued)

FOREIGN PATENT DOCUMENTS

JP    A-08-195284    7/1996
JP    A-11-307279    11/1999
(Continued)

OTHER PUBLICATIONS

Notice of Allowance dated May 10, 2013 issued in U.S. Appl. No. 12/872,279.

*Primary Examiner* — Wesner Sajous
(74) *Attorney, Agent, or Firm* — Oliff PLC

(57) ABSTRACT

An image display device includes: an external light measurement unit measuring the illuminance of an external light a plurality of times, and generating a measurement value indicating the illuminance; a storage unit storing history data which shows the measurement values, and color mode data which shows a correspondence between the illuminance and a color mode; a determination unit, based on the history data, determining whether or not it is a changed condition wherein the illuminance changes upward or downward, or the illuminance fluctuates; and an adjustment unit, in the event that it is not the changed condition, determining the color mode to be applied based on the measurement values and the color mode data, and adjusting the color or brightness of an image in accordance with the color mode, and in the event that it is the changed condition, continuing the adjustment currently being applied as the image adjustment.

6 Claims, 4 Drawing Sheets

(51) Int. Cl.

| | | |
|---|---|---|
| *H04N 1/60* | (2006.01) | |
| *H04N 5/58* | (2006.01) | |
| *H04N 9/31* | (2006.01) | |
| *G03B 21/14* | (2006.01) | |
| *H04N 21/41* | (2011.01) | |
| *H04N 21/422* | (2011.01) | |
| *H04N 21/431* | (2011.01) | |
| *G09G 3/34* | (2006.01) | |

(56) References Cited

U.S. PATENT DOCUMENTS

| | | | | |
|---|---|---|---|---|
| 8,125,559 | B2* | 2/2012 | Ludwig | H04N 5/225 |
| | | | | 348/241 |
| 8,207,953 | B2* | 6/2012 | Yamamura | G09G 3/3426 |
| | | | | 345/102 |
| 8,362,713 | B2* | 1/2013 | Recker | H05B 33/0803 |
| | | | | 307/44 |
| 8,581,921 | B2* | 11/2013 | Katahira | G09G 5/02 |
| | | | | 345/207 |
| 8,659,724 | B2* | 2/2014 | Hagiwara | G02F 1/133514 |
| | | | | 345/175 |
| 8,773,545 | B2* | 7/2014 | Koishi | G02B 21/365 |
| | | | | 348/222.1 |
| 9,251,738 | B2* | 2/2016 | Yachida | H05B 33/0854 |
| 2008/0303918 | A1 | 12/2008 | Keithley | |
| 2012/0080944 | A1 | 4/2012 | Recker et al. | |

FOREIGN PATENT DOCUMENTS

| | | |
|---|---|---|
| JP | A-2004-357193 | 12/2004 |
| JP | A-2009-25338 | 2/2009 |

* cited by examiner

IMAGE DISPLAY DEVICE AND IMAGE ADJUSTMENT METHOD

CROSS-REFERENCE

This is a Continuation application of application Ser. No. 12/872,279 filed Aug. 31, 2010, which claims priority from Japanese Patent Application No. 2009-201396 filed on Sep. 1, 2009, which is hereby incorporated by reference in its entirety.

BACKGROUND

Japanese Patent Publication No. 2009-25338 describes detecting the peripheral brightness of a projector, and adjusting the brightness of an image in accordance with the peripheral brightness. More specifically, a method whereby the luminance of an image is determined in accordance with the peripheral illuminance using a luminance specification table, and a method whereby the luminance of an image is determined by carrying out a calculation in accordance with the peripheral illuminance, are described in Japanese Patent Publication No. 2009-25338.

However, with these kinds of method, it can be supposed that the brightness of the image fluctuates due to reacting too sensitively to a change in the peripheral illuminance. For example, the brightness of the image fluctuates when someone passes in front of an illuminance sensor, when the door of a dark room opens, and the like. Also, in the case of the method using the table, when the illuminance is around the threshold value of the table, the brightness of the image fluctuates every time the illuminance is measured. In particular, when the illuminance sensor and an operating button, or the like, are disposed adjacent to each other, the illuminance sensor measurement value fluctuates during an operation, meaning that the brightness of the image is liable to fluctuate.

SUMMARY

Various embodiments may provide an image display device and image adjustment method that can display an appropriate image even when the illuminance measurement value changes.

An image display device according to at least one embodiment of the disclosure includes an external light measurement unit that measures the illuminance of an external light a plurality of times, and generates a measurement value indicating the illuminance, a storage unit that stores history data showing a plurality of the measurement values, and color mode data showing a correspondence between the illuminance and a color mode, a determination unit that, based on the history data, determines whether or not it is a changed condition indicating a condition wherein the illuminance changes upward or downward, or a condition wherein the illuminance fluctuates, and an adjustment unit that, in the event that it is not the changed condition, determines the color mode to be applied based on the measurement values and the color mode data, and adjusts the color or brightness of an image in accordance with the color mode, and in the event that it is the changed condition, continues the adjustment currently being applied as the image adjustment.

Also, an image adjustment method according to at least one embodiments of the disclosure includes allowing a computer included in an image display device to cause an illuminance sensor to measure the illuminance of an external light a plurality of times, and generate a measurement value indicating the illuminance; store history data showing a plurality of the measurement values, and color mode data showing a correspondence between the illuminance and a color mode; determine, based on the history data, whether or not it is a changed condition indicating a condition wherein the illuminance changes upward or downward, or a condition wherein the illuminance fluctuates; and, in the event that it is not the changed condition, determine the color mode to be applied based on the measurement values and the color mode data, and adjust the color or brightness of an image in accordance with the color mode, and in the event that it is the changed condition, continue the adjustment currently being applied as the image adjustment.

According to the embodiments, the image display device, by carrying out an image adjustment depending on whether or not it is the changed condition, can display an appropriate image even when the illuminance measurement value changes.

Also, an image display device according to at least one embodiments of the disclosure includes an external light measurement unit that measures the illuminance of an external light a plurality of times, and generates a measurement value indicating the illuminance, a storage unit that stores color mode data showing a correspondence between the illuminance and a color mode of an image, and hysteresis data showing a change value that, after a color mode to be applied has once been determined, changes a minimum value or maximum value of the illuminance corresponding to the color mode, and an adjustment unit that, based on the color mode data and hysteresis data, determines the color mode to be applied in a condition in which the change value is reflected after a color mode to be applied has once been determined, and adjusts the color or brightness of an image in accordance with the color mode.

Also, an image adjustment method according to at least one embodiments of the disclosure includes allowing a computer included in an image display device to cause an illuminance sensor to measure the illuminance of an external light a plurality of times, and generate a measurement value indicating the illuminance; store color mode data showing a correspondence between the illuminance and a color mode of an image, and hysteresis data showing a change value that, after a color mode to be applied has once been determined, changes a minimum value or maximum value of the illuminance corresponding to the color mode; and, based on the color mode data and hysteresis data, determine the color mode to be applied in a condition in which the change value is reflected after a color mode to be applied has once been determined, and adjust the color or brightness of an image in accordance with the color mode.

Also, the storage unit may store hysteresis data showing a change value that, after a color mode to be applied has once been determined, changes a minimum value or maximum value of the illuminance corresponding to the color mode, and the adjustment unit, based on the color mode data and hysteresis data, may determine the color mode to be applied in a condition in which the change value is reflected after a color mode to be applied has once been determined, and adjust the color or brightness of an image in accordance with the color mode.

According to the embodiments, the image display device, by using the hysteresis data, can display an appropriate image even when the illuminance measurement value changes.

Also, the determination unit may determine in a case in which the value of a difference between a minimum value and maximum value of the measurement values in the predetermined number of measurements is equal to or higher than a first predetermined value that it is a condition wherein the illuminance upward or downward changes.

Because of this, as the image display device can appropriately determine whether or not it is a changed condition depending on the value of the difference between the minimum value and maximum value of the measurement values, it can display an appropriate image even when the illuminance measurement value changes.

Also, the image display device may also include an update unit, wherein the storage unit stores setting data showing the number of measurements and the first predetermined value, the update unit, based on request information indicating a request to change the number of measurements or first predetermined value, updates the setting data, and the determination unit, based on the setting data, determines whether or not it is a condition wherein the illuminance upward or downward changes.

Because of this, as the image display device can appropriately determine whether or not it is a changed condition in accordance with an actual usage environment, or the like, it can display an appropriate image even when the illuminance measurement value changes.

Also, the image display device may also include an operating unit, wherein the external light measurement unit is disposed adjacent to the operating unit.

Because of this, even in a condition in which the illuminance measurement value is liable to fluctuate due to an operation of the operating unit, the image display device, by carrying out an adjustment of the image depending on whether or not it is a changed condition, can display an appropriate image even when the illuminance measurement value changes.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Figure 1:
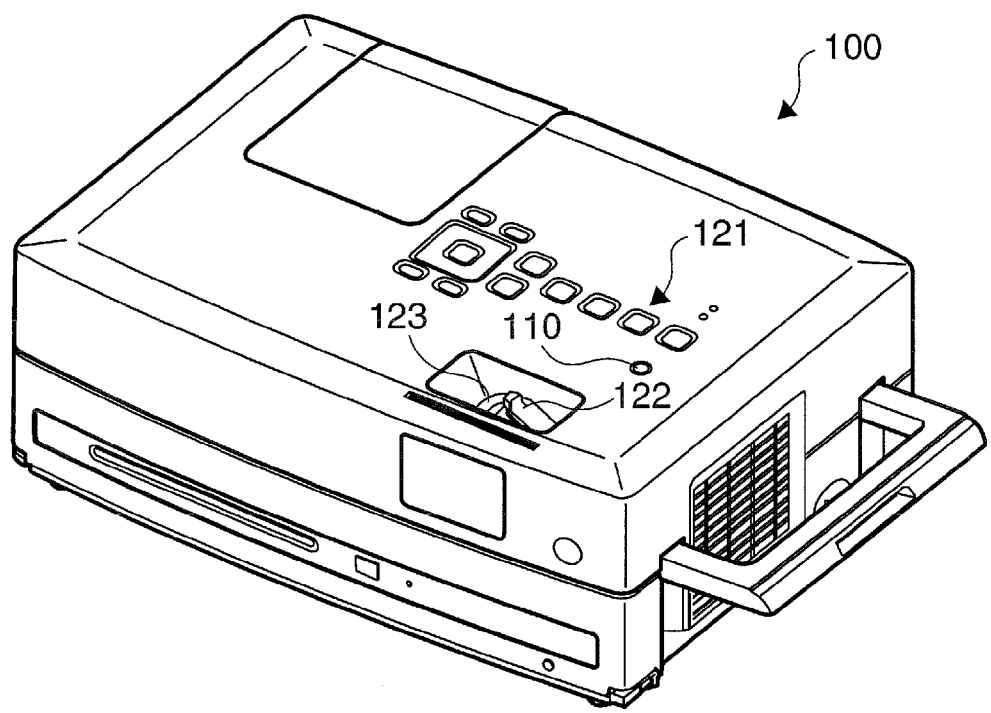
FIG. 1 is an external view of a projector in a first embodiment.

Hereafter, a description will be given, while referring to the drawings, of embodiments in which the invention is applied to a projector. The embodiments shown hereafter do not in any way limit the scope of the invention described in the appended claims. Also, not all of the configurations shown in the following embodiments are necessarily essential as solutions of the invention described in the appended claims.

First Embodiment

FIG. 1 is an external view of a projector 100 in a first embodiment. The projector 100, which is one kind of image display device, is a portable projector. A plurality of operating buttons 121, a zoom adjusting zoom ring 122, a focus adjusting focus ring 123, and the like, are provided on the upper surface opposing the grounded surface of the projector 100, and an external light measurement unit 110 for measuring the illuminance of an external light (for example, an illumination beam from a fluorescent light or the like, or sunlight) is provided between the operating buttons 121 and zoom ring 122.

As a hand covers a measurement subject region of the external light measurement unit 110 when operating, and the measurement value changes, when the external light measurement unit 110 is disposed adjacent to the operating unit in this way, in a general projector, there is liable to be an effect on an adjustment of image brightness, and the like. The projector 100 of the embodiment determines a color mode using measurement value history data, and furthermore, by using hysteresis data when determining the color mode from a second time onward, suppresses the effect caused by the change of the measurement value.

Figure 2:
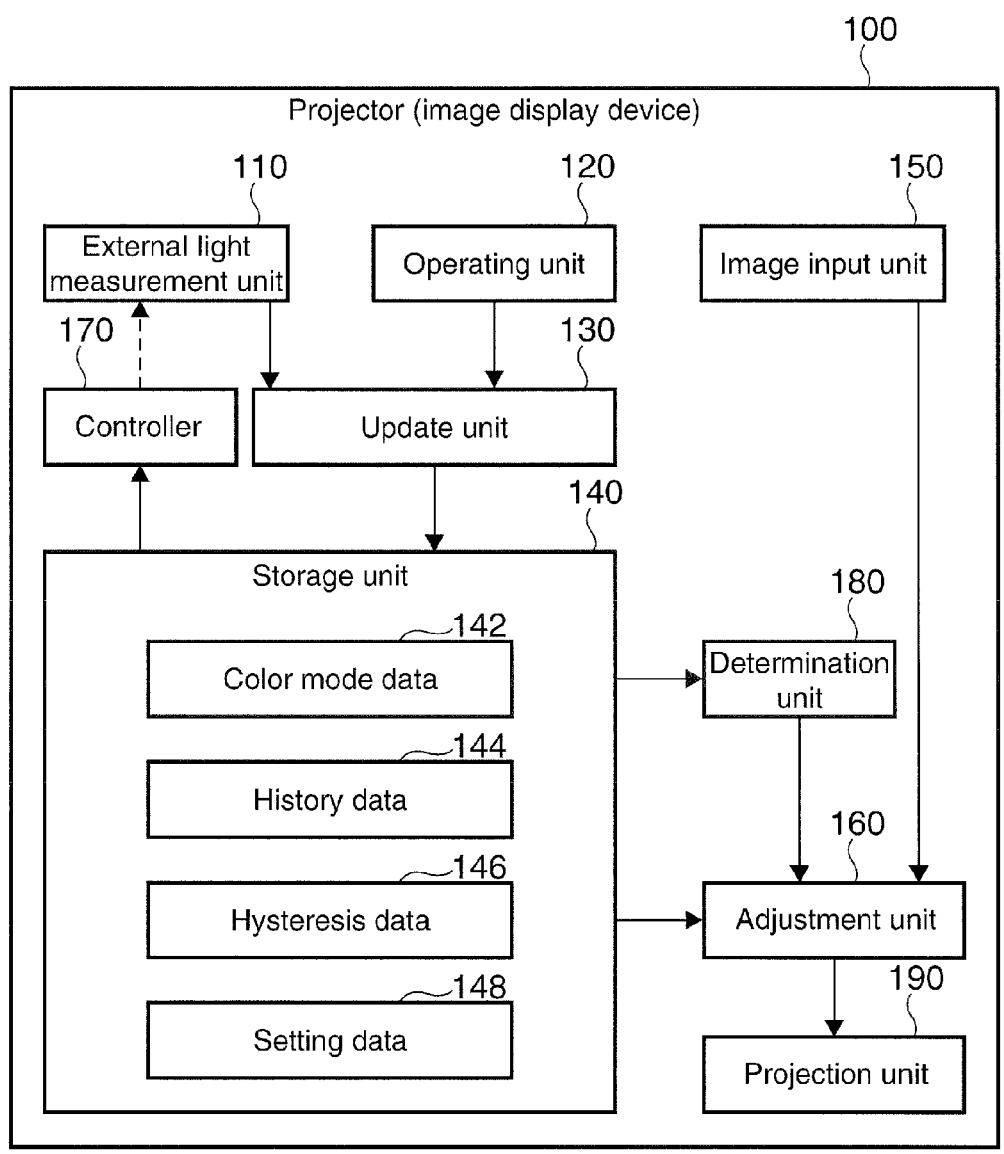
FIG. 2 is a functional block diagram of the projector in the first embodiment.

Next, a description will be given of a functional block of the projector 100 having this kind of function. FIG. 2 is a functional block diagram of the projector 100 in the first embodiment. The projector 100 is configured including the external light measurement unit 110, which measures the illuminance of an external light a plurality of times, and generates a measurement value indicating the illuminance, an operating unit 120 that generates operation information, and the like, in accordance with an operation by a user, a storage unit 140 that stores various data, an update unit 130 that updates the data in accordance with the operation information, and the like, an image input unit 150 into which is input an image signal from an image supply device such as a personal computer (PC), an adjustment unit 160 that carries out an adjustment of the color and brightness of an image, a controller 170 that carries out various controls, a determination unit 180 that carries out various determinations, and a projection unit 190 that projects the image after adjustment.

Also, the storage unit 140 stores color mode data 142 showing illuminances, color modes, and color and brightness adjustment values for each color mode, history data 144 showing a plurality of measurement values, hysteresis data 146 showing change values that change a minimum value and maximum value of an illuminance corresponding to a color mode, setting data 148 showing a prescribed number of measurements, a determination reference value, and the like, and the like.

Also, the projector 100 may function as each unit using the following hardware. For example, the projector 100 is such that the external light measurement unit 110 may use an illuminance sensor, or the like, the operating unit 120 the operating buttons 121, the zoom ring 122, the focus ring 123, a remote control, and the like, the update unit 130, controller 170, and determination unit 180 a CPU, or the like, the storage unit 140 a non-volatile memory, or the like, the image input unit 150 an image signal input terminal, a converter, and the like, the adjustment unit 160 the CPU, an image processing circuit, and the like, and the projection unit 190 a dimming device, a lamp, a liquid crystal panel, a liquid crystal drive circuit, a lens, and the like.

Figure 3:
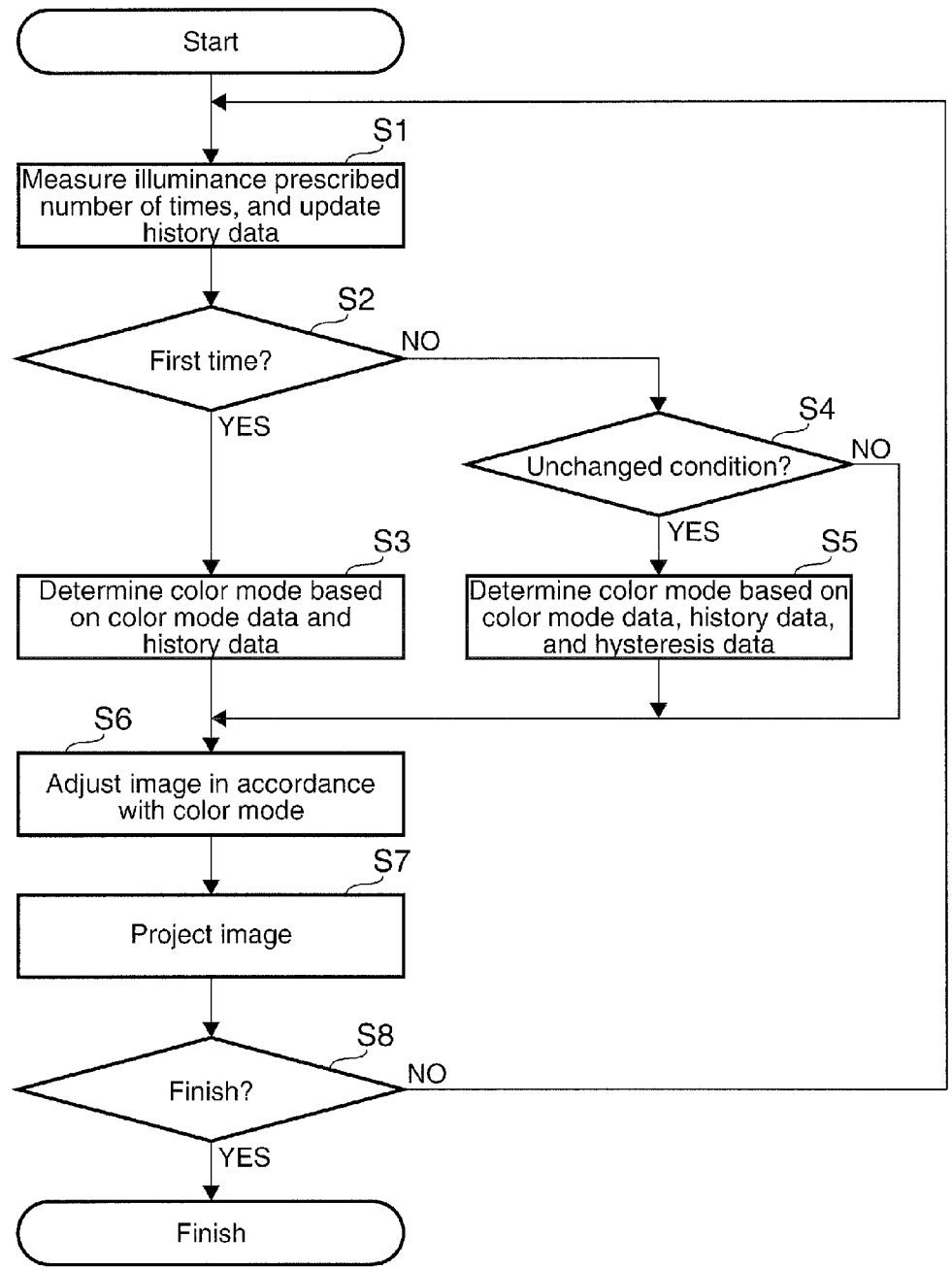
FIG. 3 is a flowchart showing an image adjustment procedure in the first embodiment.

Next, a description will be given of an image adjustment procedure with the projector 100. FIG. 3 is a flowchart showing the image adjustment procedure in the first embodiment.

The controller 170, based on the setting data 148, causes the external light measurement unit 110 to measure the illuminance of an external light falling incident on the external light measurement unit 110 a prescribed number of times (for example, ten times) at a set measurement time interval (for example, every 0.5 seconds). The update unit 130, based on measurement values from the external light measurement unit 110, updates the history data 144 (step S1). As the external light measurement unit 110 is provided on the upper surface of the projector 100, as shown in FIG. 1, the illuminance of external light falling incident from the upper surface side of the projector 100 is measured.

The determination unit 180 determines whether or not it is a first time adjustment (step S2). If it is a first time adjustment, the adjustment unit 160, based on the color mode data 142 and history data 144, determines the color mode to be applied (step S3).

Meanwhile, if it is not a first time adjustment, that is, if it is a second time adjustment or later, the determination unit 180 determines whether or not it is an unchanged condition, that is, whether or not the illuminance is stable (step S4). As the illuminance is stable if it is an unchanged condition, the adjustment unit 160, based on the color mode data 142, history data 144, and hysteresis data 146, determines the color mode to be applied (step S5). Meanwhile, as the illuminance is unstable if it is a changed condition, the current color mode is the color mode applied.

The changed condition is, for example, a condition wherein the illuminance changes upward or downward, or a condition wherein the illuminance fluctuates. Specifically, for example, a case in which the value of the difference between the minimum value and maximum value of the measurement values in the predetermined number of measurements (for example, ten times) is equal to or higher than a first predetermined value (for example, 50) corresponds to a condition wherein the illuminance upward or downward changes. Also, for example, a case in which a condition continues wherein the difference value is lower than the first predetermined value, and equal to or higher than a second predetermined value (for example, 30) lower than the first predetermined value, corresponds to a condition wherein the illuminance fluctuates.

Figure 4:
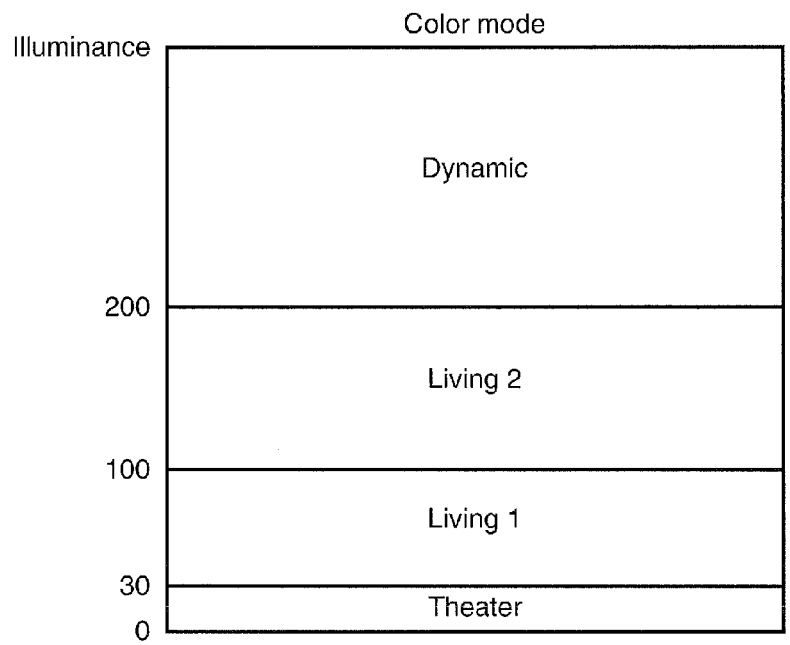
FIG. 4 is a diagram showing one example of a correspondence between illuminance and a color mode a first time.
Figure 5:
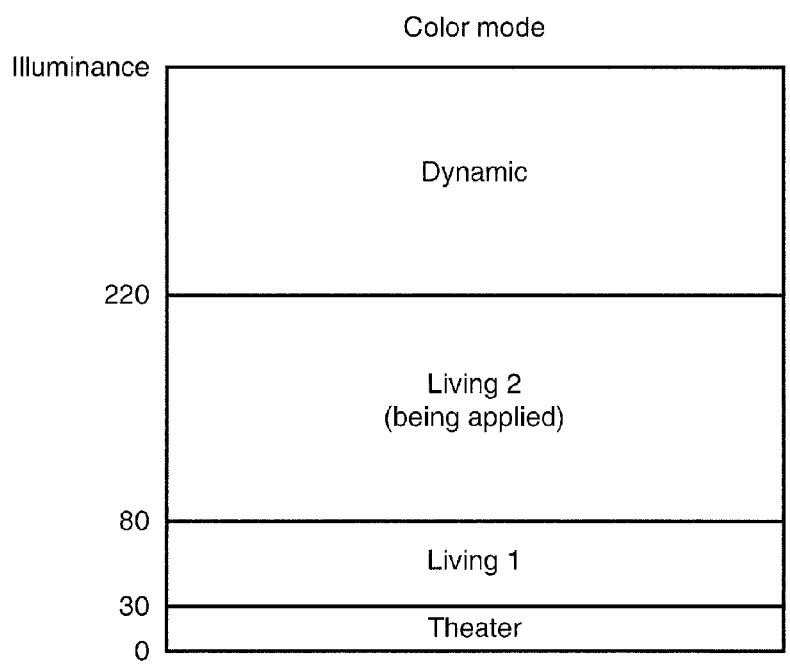
FIG. 5 is a diagram showing one example of the correspondence between the illuminance and the color mode from a second time onward.

Herein, a description will be given of a correspondence between the illuminance and color mode the first time and from the second time onward. FIG. 4 is a diagram showing one example of the correspondence between the illuminance and color mode the first time. Also, FIG. 5 is a diagram showing one example of the correspondence between the illuminance and color mode from the second time onward.

For example, in an initial condition, the color mode applied when the illuminance is equal to or greater than 0 and less than 30 is "theater", the color mode applied when the illuminance is equal to or greater than 30 and less than 100 is "living 1", the color mode applied when the illuminance is equal to or greater than 100 and less than 200 is "living 2", and the color mode applied when the illuminance is equal to or greater than 200 is "dynamic". When the first time illuminance measurement value (for example, the average value of the measurement values for the ten measurements) is 110, the color mode applied is "living 2".

When the color mode has once been determined, the change value of the hysteresis data 146 is reflected in the upper limit value and lower limit value of the illuminance corresponding to the color mode. Herein, it is taken that the change value is 20. That is, from the second time onward, by the upper limit value and lower limit value of the illuminance corresponding to the color mode being applied changing by 20, the upper limit value becomes 220, and the lower limit value 80. Because of this, the color mode applied when the illuminance is equal to or greater than 80 and less than 220 is "living 2".

Consequently, for example, when the second time illuminance measurement value is 95, with a normal method the color mode changes from "living 2" to "living 1", but with the method of the embodiment, the color mode remains unchanged at "living 2".

The adjustment unit 160 adjusts an image in accordance with the determined color mode (step S6). More specifically, for example, the adjustment unit 160 adjusts the image brightness, contrast, coloring, color deepness, sharpness, and color temperature, the aperture ratio and lamp brightness of the dimming device in the projection unit 190, and the like, in accordance with the color mode adjustment values shown in the color mode data 142, and generates the image based on an image signal from the image input unit 150.

The projection unit 190 projects the image onto a screen, or the like, in the condition into which it has been adjusted by the adjustment unit 160 (step S7).

The projector 100, based on operation information from the operating unit 120, determines whether or not there is a finishing command (step S8), continues the series of processes (steps S1 to S8) if there is no finishing command, and finishes the series of processes if there is a finishing command.

As heretofore described, according to the embodiment, the projector 100, by carrying out an adjustment of the image depending on whether or not it is a changed condition, can display an appropriate image even when the illuminance measurement value changes.

Also, according to the embodiment, the projector 100, by using the hysteresis data 146, can display an appropriate image even when the illuminance measurement value changes.

Also, according to the embodiment, as the projector 100 can appropriately determine whether or not it is a changed condition depending on the value of the difference between the minimum value and maximum value of the measurement values, it can display an appropriate image even when the illuminance measurement value changes.

In particular, although the illuminance measurement value is liable to change due to an operation of the operating unit 120 when the external light measurement unit 110 is disposed adjacent to the operating unit 120, as shown in FIG. 1, the projector 100, by carrying out an adjustment of the image depending on whether or not it is a changed condition, can display an appropriate image even when the illuminance measurement value changes.

Other Embodiments

The application of the invention not being limited to the heretofore described embodiment, various modifications are possible. For example, the operating unit 120 may generate request information indicating a request to change at least one of the prescribed number of times and first predetermined value in response to an operation by the user, the update unit 130 update the setting data 148 based on the request information, and the determination unit 180, based on the updated setting data 148, determine whether or not it is a condition wherein the illuminance upward or downward changes.

Because of this, as the projector 100 can appropriately determine whether or not it is a changed condition in accordance with an actual usage environment, or the like, it can display an appropriate image even when the illuminance measurement value changes.

Also, the operating unit 120 may generate request information indicating a request to change at least one of the color mode data 142, hysteresis data 146, and the like, in response to an operation by the user, and the update unit 130 update the color mode data 142, hysteresis data 146, setting data 148, and the like, based on the request information.

Because of this, as the projector 100 can update the maximum value and minimum value of the illuminance corresponding to the color mode, the applicable color mode, the adjustment values for each color mode, the change value, and the like, in response to a request from the user, and can determine the color mode, and the like, in accordance with the actual usage environment, it can project a more appropriate image.

Also, the adjustment unit 160, as an image adjustment in accordance with the color mode, may adjust both the color and brightness of the image, may adjust only the color of the image, or may adjust only the brightness of the image. Also, in the heretofore described embodiment, the projector 100 uses both the history data 144 and hysteresis data 146, but it may use only the hysteresis data 146 without using the history data 144, or may use only the history data 144 without using the hysteresis data 146.

Also, the adjustment unit 160, when a newly applied color mode differs by two levels or more from the original color mode (for example, in FIG. 5, a case in which the newly applied color mode is "theater" and the original color mode is "living 2"), may change to the newly applied color mode at one time, or may change to the newly applied color mode in stages (for example, in the heretofore mentioned case, change to "theater" after once applying "living 1").

Also, a plurality of kinds of data may be provided as the color mode data 142 in accordance with the model and use of the projector 100. For example, the storage unit 140 may store color mode data for domestic use, color mode data for commercial use, and color mode data for use in a place of education, and the adjustment unit 160 may select and use the color mode data in accordance with a flag indicating the use.

Also, the determination unit 180 may determine that it is an unchanged condition during a prescribed time (for example, five seconds) after a new color mode is applied, and the adjustment unit 160 adjust in such a way as not to change the color mode during the prescribed time after the new color mode is applied.

Because of this, as the projector 100 can curb the change of the image, it is easy for the user to observe the image.

Also, the quantity of the external light measurement unit 110 not being limited to one, it may also be two or more. For example, one external light measurement unit 110 may be provided on each of the upper surface and rear surface (the surface opposite the projection surface on which the projection lens exists) of the projector 100.

Also, the projector 100 may function as each unit of the projector 100 by reading a program stored on an information storage medium.

Also, the projector 100, not being limited to a liquid crystal projector (a transmission type, or a reflection type such as an LCOS), may be, for example, a projector using a digital micromirror device, or the like. Also, the functions of the projector 100 may be dispersed among a plurality of devices (for example, a PC and a projector).

Also, the image display device, not being limited to the projector 100, may be, for example, a television, a digital camera, a digital video camera, a mobile telephone, a portable game device, or a liquid crystal display.

What is claimed is:

1. An image display device comprising:
    an external light measurement unit that measures the illuminance of an external light a plurality of times, and generates a measurement value indicating the illuminance;
    a storage unit that stores history data showing a plurality of the measurement values;
    a determination unit that, based on the history data, determines whether or not it is a changed condition indicating a condition wherein the illuminance fluctuates; and
    an adjustment unit that, in the event that the determination unit determines that it is not the changed condition, determines a color mode to be applied based on the measurement values, and in the event that the determination unit determines that it is the changed condition, keeps the currently applied color mode.

2. The image display device according to claim 1, wherein the adjustment unit adjusts the color or brightness of the image in accordance with the color mode.

3. The image display device according to claim 1, wherein the storage unit stores hysteresis data showing a change value that changes a minimum value or maximum value of the illuminance corresponding to the color mode; and
    the adjustment unit, based on the hysteresis data, determines the color mode to be applied.

4. The image display device according to claim 1, wherein the determination unit determines that it is a condition wherein the illuminance fluctuates in a case in which the value of a difference between a minimum value and maximum value of the measurement values in the predetermined number of measurements is equal to or higher than a first predetermined value.

5. The image display device according to claim 1, comprising:
    an operating unit, wherein
    the external light measurement unit is disposed adjacent to the operating unit.

6. An image adjustment method for an image display device, comprising:
    using an illuminance sensor to measure the illuminance of an external light a plurality of times, and generating a measurement value indicating the illuminance;
    storing history data showing a plurality of the measurement values;
    determining, based on the history data, whether or not it is a changed condition indicating a condition wherein the illuminance fluctuates; and
    in the event that it is not the changed condition, setting the color mode of the image display device based on the measurement values, and in the event that it is the changed condition, keeping a currently applied color mode.

* * * * *